(12) United States Patent
Chen et al.

(10) Patent No.: US 6,619,634 B2
(45) Date of Patent: Sep. 16, 2003

(54) SELF-CHARGEABLE PNEUMATIC CYLINDER

(75) Inventors: Robert Chen, Cerritos, CA (US); Pinchieh Feng, Chang Hua Sheng (TW)

(73) Assignee: Razor USA, LLC, Cerritos, CA (US)

( * ) Notice: Subject to any disclaimer, the term of this patent is extended or adjusted under 35 U.S.C. 154(b) by 0 days.

(21) Appl. No.: 09/891,872

(22) Filed: Jun. 22, 2001

(65) Prior Publication Data

US 2002/0158379 A1 Oct. 31, 2002

Related U.S. Application Data

(60) Provisional application No. 60/286,825, filed on Apr. 27, 2001.

(51) Int. Cl.[7] .................................................. F16F 9/14
(52) U.S. Cl. .................................................. 267/64.17
(58) Field of Search ......................... 267/64.17, 64.14, 267/DIG. 2, DIG. 1; 188/322.16, 322.22; 482/77

(56) References Cited

U.S. PATENT DOCUMENTS

| 2,865,633 | A |   | 12/1958 | Woodall |          |
|-----------|---|---|---------|---------|----------|
| 3,351,342 | A |   | 11/1967 | Guin    |          |
| 3,497,199 | A | * | 2/1970  | Tuczek  | 267/64.17 |
| 4,139,182 | A |   | 2/1979  | Nagase et al. | |
| 4,245,826 | A |   | 1/1981  | Wirges  |          |
| 4,632,371 | A |   | 12/1986 | Wirges et al. | |
| 5,040,645 | A |   | 8/1991  | Völpel et al. | |
| 5,154,264 | A |   | 10/1992 | Poertzgen et al. | |
| 5,248,131 | A |   | 9/1993  | Jobelius |         |
| 5,941,508 | A | * | 8/1999  | Murata et al. | 267/64.17 |
| 6,066,073 | A |   | 5/2000  | Stearns et al. | |
| 6,234,462 | B1 | * | 5/2001  | Beck et al. | 267/64.17 |
| 6,251,047 | B1 |   | 6/2001  | Stearns et al. | |

FOREIGN PATENT DOCUMENTS

DE              27 04 170          8/1978

* cited by examiner

Primary Examiner—Christopher P. Schwartz
Assistant Examiner—Xuan Lan Nguyen
(74) Attorney, Agent, or Firm—Knobbe, Martens, Olson & Bear LLP

(57) ABSTRACT

A self-chargeable pneumatic cylinder comprises a cylinder body, a working piston disposed inside the cylinder body, and a hollow elongate shaft coupled to the working piston and extending outward from the cylinder body. The hollow interior of the shaft contains a pump mechanism for charging the pneumatic cylinder with a gas. The pump mechanism comprises a pumping piston that is axially slidable within the interior of the shaft and a pumping rod coupled to the pumping piston that is extendable out of the shaft for facilitating actuation of the pump. As the pump is manually actuated, pressurized gas flows into the cylinder body across a one-way valve to charge the pneumatic cylinder as desired.

7 Claims, 9 Drawing Sheets

SELF-CHARGEABLE PNEUMATIC CYLINDER

RELATED APPLICATIONS

The present application claims priority under 35 U.S.C. §119(e) to U.S. Provisional Application No. 60/286,825, filed Apr. 27, 2001.

BACKGROUND OF THE INVENTION

1. Field of the Invention

The present invention relates generally to a pneumatic cylinder, and more particularly to a compact self-chargeable pneumatic cylinder.

2. Background of the Invention

Pneumatic cylinders are used in various applications such as air springs, actuation devices, and exercise equipment. Conventional pneumatic cylinders generally comprise a hollow cylinder body, a piston disposed in the interior of the cylinder body, and a shaft coupled to the piston that extends out of the cylinder body.

Regardless of how a pneumatic cylinder is used, the gas chamber in the cylinder must be charged with a gas, such as atmospheric air, in order for the cylinder and piston arrangement to be operational. Various apparatuses and methods have been proposed wherein an external pump is used to charge the cylinder with a gas. However, in many situations, an external pump is not readily available due to the location of the cylinder, the mobility of the cylinder or the nature of the use. Furthermore, powered air pumps are only available in a very limited number of locations and manual pumps are burdensome to use and are often impractical to transport.

In the past, attempts have been made to provide a self-chargeable pneumatic cylinder wherein a manual pump mechanism is attached to the cylinder such that the device is not dependent on an external pump. However, each of these attempts has fallen short because the self-chargeable pneumatic cylinders that have been proposed heretofore involve a large number of components thereby making the cylinders expensive to manufacture and prone to mechanical failures. In addition, each of the existing self-chargeable pneumatic cylinders has a pump mechanism mounted on the exterior of the cylinder. This is a significant shortcoming because the external pump structure significantly increases the size of the cylinder and also detracts from the aesthetic appeal. Because of the bulkiness of these devices, in many applications, the external pump structure makes the pneumatic cylinder impractical for use due to spatial limitations. For these reasons, none of the proposed self-chargeable pneumatic cylinders has gained widespread acceptance.

SUMMARY OF THE INVENTION

The preferred embodiments of the present invention provide a new and improved self-chargeable pneumatic cylinder that does not require an external pump. The preferred embodiments also provide a self-chargeable pneumatic cylinder that is compact in size and has a rugged construction that ensures high quality and durability. Another feature of the preferred embodiments is that the self-chargeable pneumatic cylinder is well-suited for use as a pneumatic spring whereby the stiffness of the spring can be easily adjusted using the charging mechanism. The preferred embodiments are adapted to be made of a lightweight material that is resistant to corrosion. The preferred embodiments also provide a self-chargeable pneumatic cylinder that is very reliable, convenient to use and inexpensive to manufacture.

A significant feature of the self-chargeable pneumatic cylinder in accordance with the present invention is the location of the internal pump mechanism. The pump mechanism is substantially self-contained within the interior portion of the pneumatic cylinder and therefore does increase the overall dimensions of the device. In addition, because the pump mechanism is located internally, the components of the pump mechanism are well protected from damage.

In accordance with one aspect of the present invention, a pneumatic cylinder is presented generally comprising a hollow cylinder body having a closed end and an open end and a working piston slidably disposed in the interior of the cylinder body. A hollow elongate shaft is coupled to the working piston and extends out of the cylinder body via the open end. In a novel feature of the preferred embodiments of the present invention, the hollow interior portion of the shaft contains a manual pump mechanism. The manual pump mechanism generally comprises a pumping piston slidably disposed in the interior of the shaft and a pumping rod coupled to the pumping piston. The pumping rod is extendable out of the shaft via the open end and a handgrip is provided at the free end thereof for facilitating actuation of the pumping piston.

In another aspect of the present invention, the internal pump mechanism advantageously includes a check device disposed on the pumping piston. The check device comprises an annular slot formed in the periphery of the pumping piston and an O-ring disposed in the annular slot. The O-ring is in frictional engagement with the inner wall of the shaft at all times. Due to frictional forces, the O-ring is forced upward against the top of the annular slot as the pumping piston is retracted through the interior of the shaft. With the O-ring in this configuration, air is free to pass around the pumping piston into a pressure adding chamber. When the pumping piston is subsequently advanced back into the shaft, the O-ring presses against the bottom of the annular slot and forms a seal that prevents air from escaping the pressure adding chamber.

In another aspect of the present invention, a one-way valve is advantageously provided that extends through the working piston. The one-way valve allows air to flow in one direction only from the pressures adding chamber into the pressure cylinder to charge the cylinder with air as the pumping piston is actuated.

In another aspect of the present invention, the pneumatic cylinder is advantageously provided with a two-way valve disposed on the closed end of the cylinder body. The two-way valve provides an alternative means for rapidly charging the gas chamber in the cylinder. The two-way valve also provides a means to rapidly discharge the gas from the gas chamber to the atmosphere.

In another aspect of the preferred embodiments of the present invention, the shaft can be fully advanced into the cylinder after discharging all the gas from the cylinder. This feature can be used to reduce the size of the device for compact storage or transportation.

In another aspect of the present invention, the pneumatic cylinder is well adapted for use as a pneumatic spring in a pogo stick. The pressure in the gas chamber can be varied using the pump mechanism and/or the two-way valve to accommodate the body weight and skill level of the user. In this application, a buffer sleeve may be placed over the bottom end of the shaft to provide a foot for engagement with the ground during use. Because of the compact size of the pneumatic cylinder, the device is particularly well-suited for use with a pogo stick that is collapsible into a small volume.

In yet another aspect of the present invention, the pneumatic cylinder is well adapted for use with exercise equipment. The cylinder can be used with a wide variety of exercise machines wherein a resistance force is desirable. In this application, the resistance force can be adjusted to suit the user's exercise needs by varying the pressure in the cylinder.

DETAILED DESCRIPTION OF THE INVENTION

Figure 1:
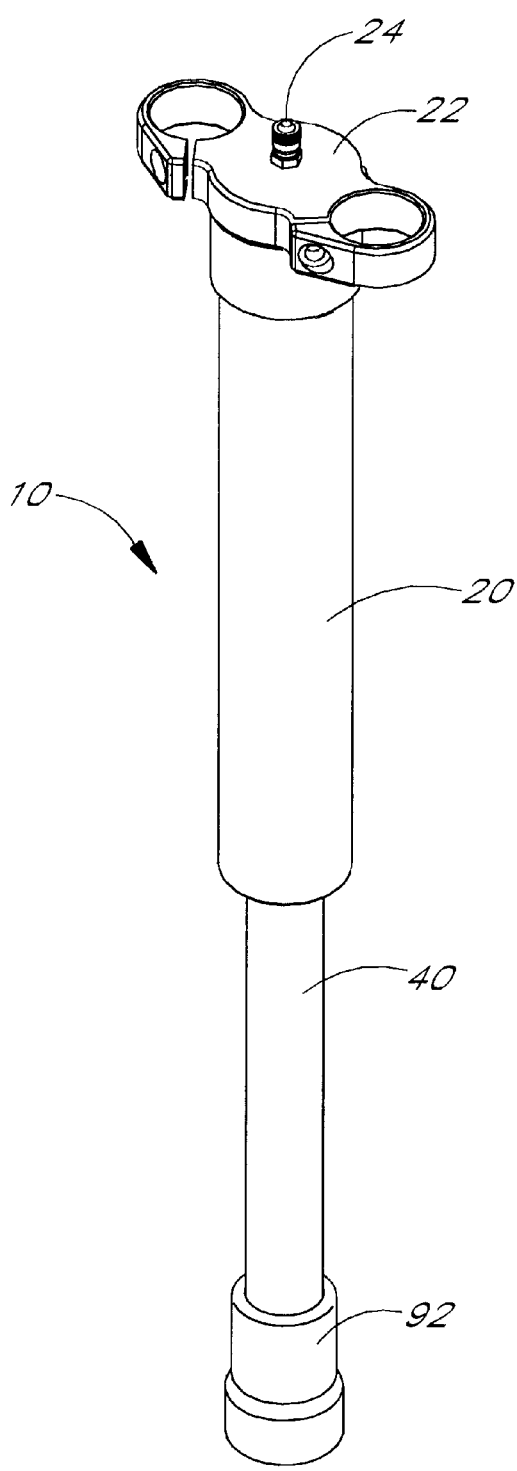
FIG. 1 shows a perspective view of a preferred embodiment of the self-chargeable pneumatic cylinder of the present invention.
Figure 2:
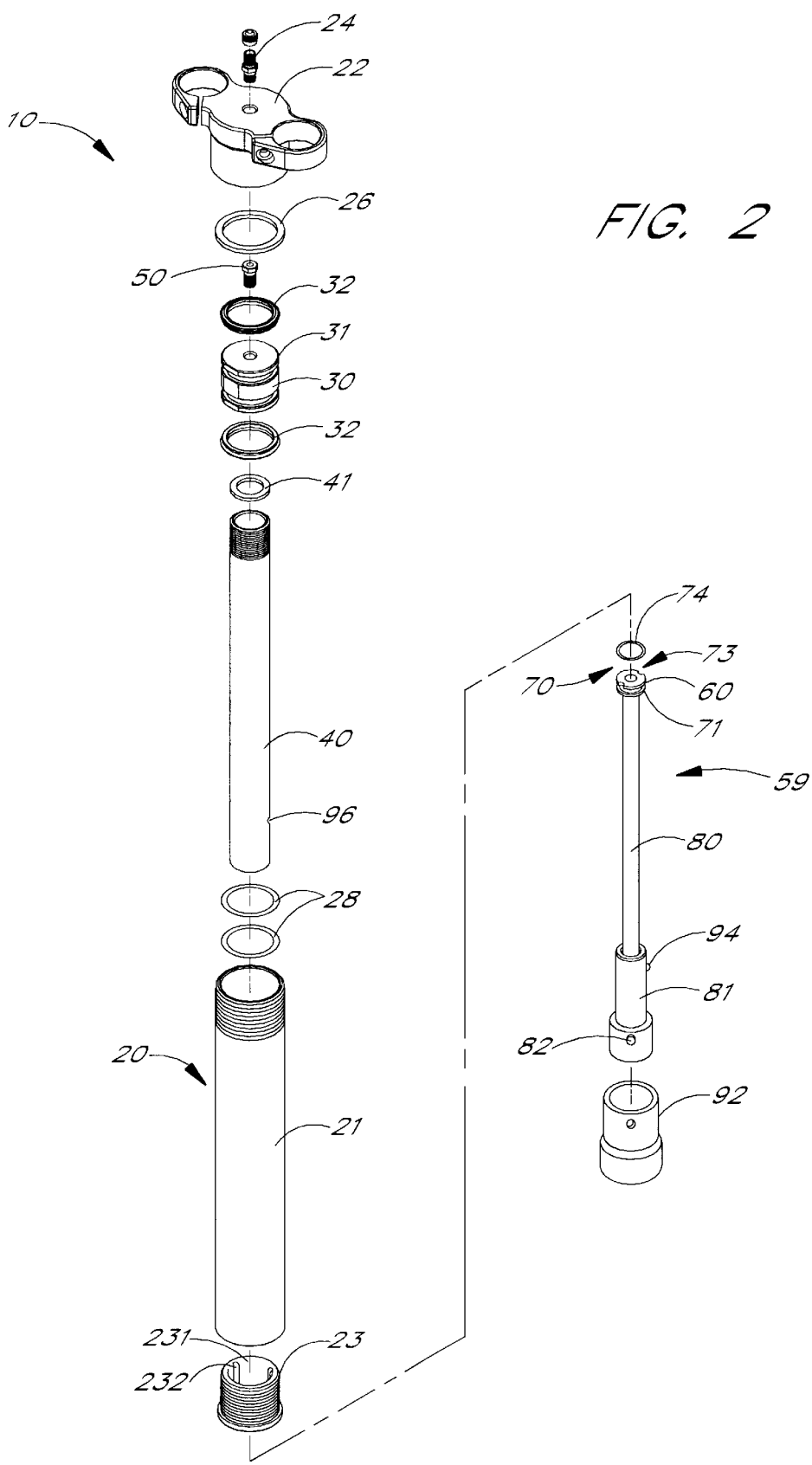
FIG. 2 shows an exploded view of the self-chargeable pneumatic cylinder of FIG. 1.
Figure 3:
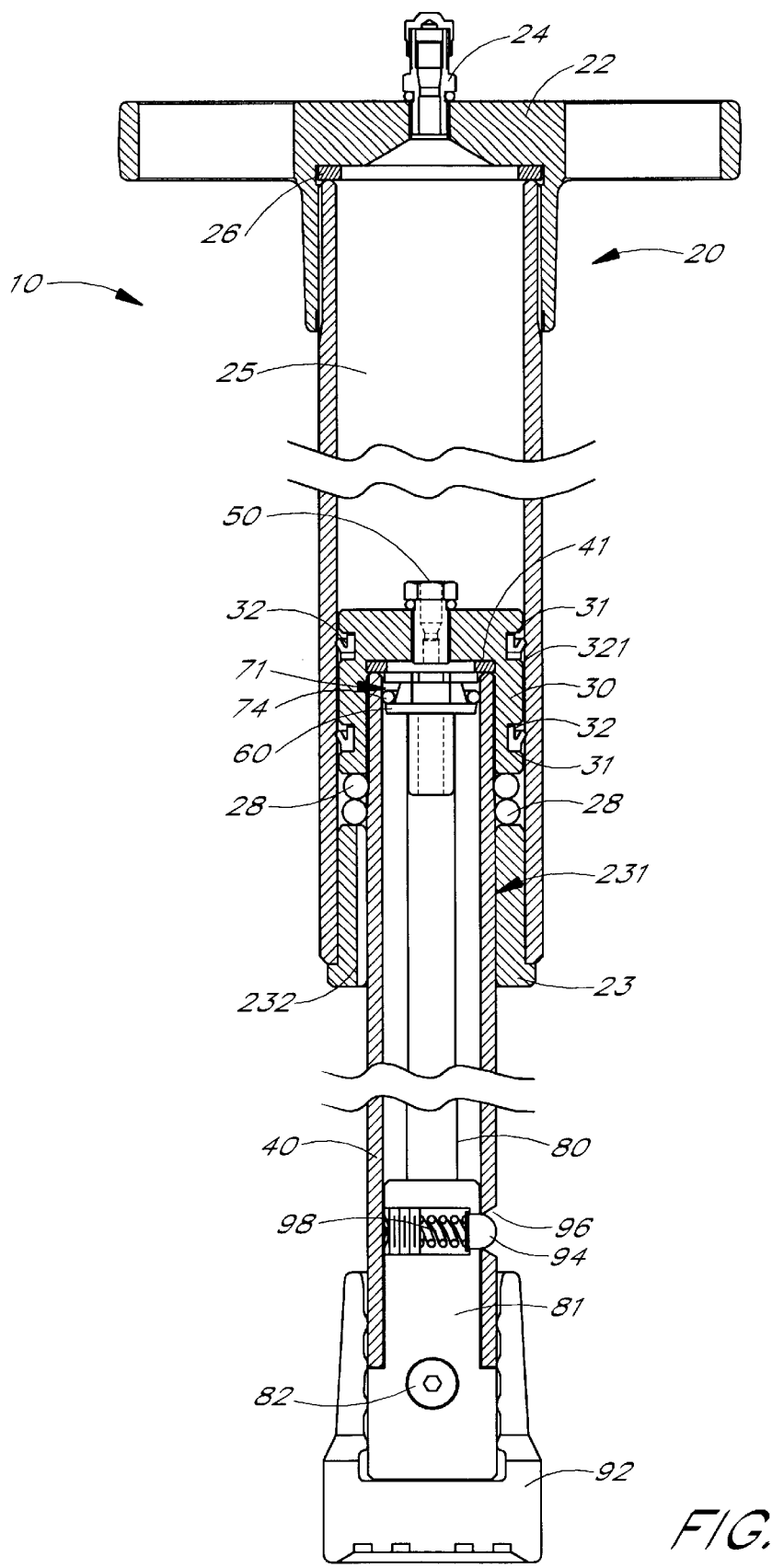
FIG. 3 shows a sectional view of the self-chargeable pneumatic cylinder of FIG. 1

FIGS. 1–3 illustrate a preferred embodiment of a self-chargeable pneumatic cylinder 10 in accordance with the present invention. The self-chargeable pneumatic cylinder 10 includes, generally, a hollow cylinder body 20, a working piston 30, a hollow elongate shaft 40, a one-way valve 50, a pumping piston 60, a check device 70, and a pumping rod 80.

The cylinder body 20 comprises a cylindrical tube 21, a top cover 22 for closing the top end of the cylindrical tube 21, and an end member 23 fastened to the bottom end of the cylindrical tube 21. A washer 26 is provided between the top end of the cylindrical tube 21 and the top cover 22 to ensure an airtight seal is formed therebetween. The interior of the cylinder body 20 defines a gas chamber 25 in the region between the top cover 22 and the working piston 30. A two-way air valve 24 is disposed on the top cover 22 for selectively providing communication between the atmosphere and the gas chamber 25.

The working piston 30 is slidably disposed in the interior of the cylindrical tube 21. The periphery of the piston 30 is provided with two annular slots 31 for respectively accommodating two piston rings 32. Each of the piston rings 32 is provided with a pliable lip portion 321 on the outer edge as shown in FIG. 3. When the working piston 30 is moved inward or outward in relation to the cylindrical tube 21, the piston rings 32 serve to provide an airtight seal between the working piston 30 and the inner wall of the cylindrical tube 21.

The hollow elongate shaft 40 is coupled at the top end to the working piston 30. A washer 41 is provided between the top end of the shaft 40 and the working piston 30 to ensure that an airtight seal is formed therebetween. The end member 23 is provided at the bottom end of the cylindrical tube 21 and is formed with an opening 231 through which the shaft 40 extends outward therefrom. Three gas slots 232 extend axially along the opening 231 to allow atmospheric air to enter or exit the cylindrical tube 21 in the region behind the working piston 30. The end member 23 and the working piston 30 are provided therebetween with two buffer rings 28 made of a resilient material. The buffer rings 28 provide a cushion to protect the components and reduce the noise that is produced when the working piston 30 contacts the end member 23.

In a novel feature of the preferred embodiments of this invention, a manual pump 59 is substantially contained within the hollow interior portion of the shaft 40. The manual pump 59 generally comprises the pumping piston 60, the pumping rod 80, and the check device 70. The manual pump 59 enables the user to charge the cylinder body 20 without using an external source of pressurized gas. Because the mechanism of the manual pump 59 is substantially contained within the shaft 40, the overall size of the pneumatic cylinder is not increased by the pump structure.

Figure 4:
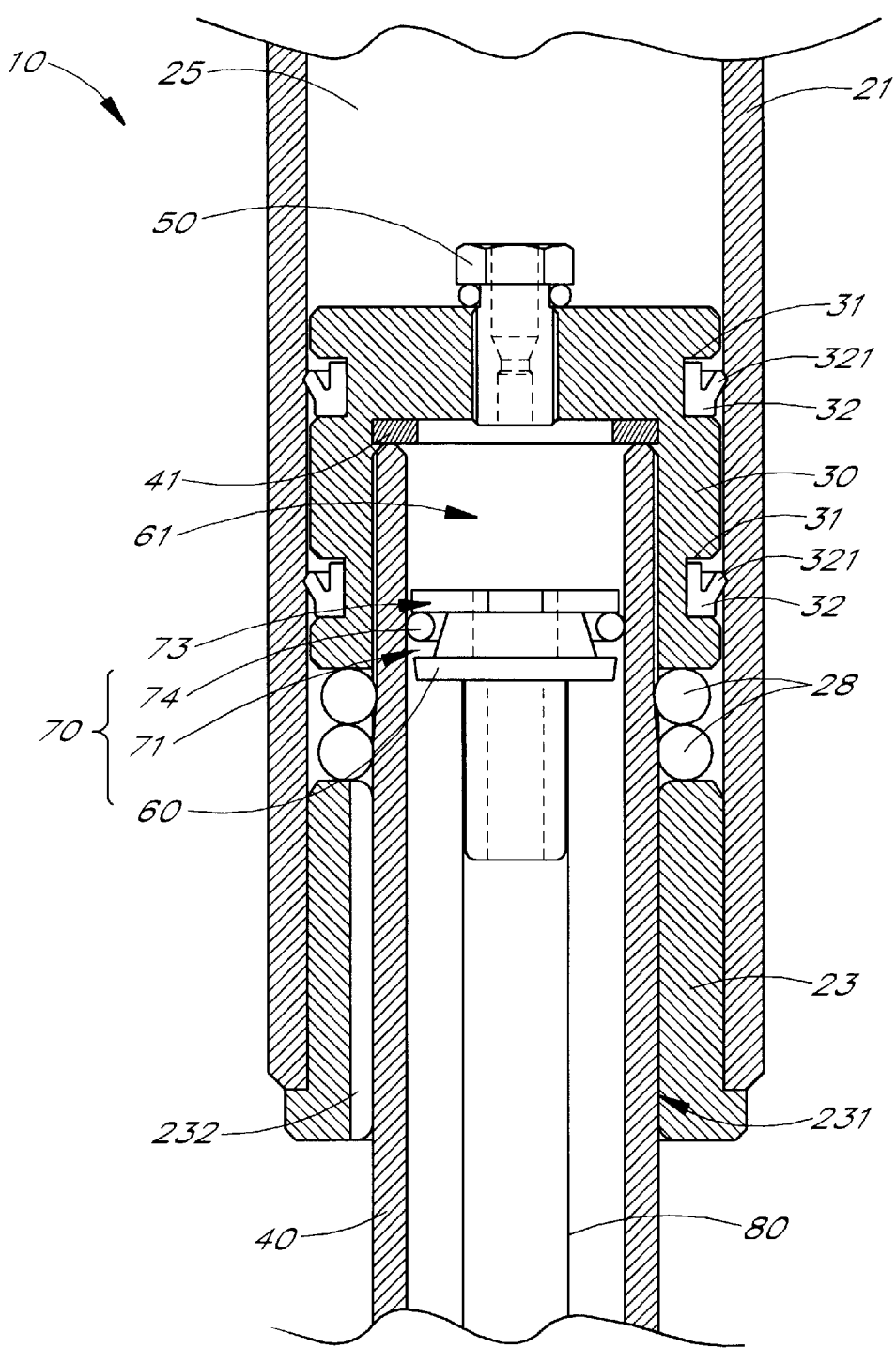
FIG. 4 shows an enlarged sectional view of the pump mechanism of the self-chargeable pneumatic cylinder of FIG. 1.

With reference now to FIG. 4, the details of the manual pump 59 are shown in greater detail. The pumping piston 60 is disposed in the interior of the shaft 40 such that a pressure adding chamber 61 is formed between the bottom end of the working piston 30 and the top end of the pumping piston 60. The one-way valve 50 extends through the working piston 30 for allowing gas to enter the gas chamber 25 from the pressure adding chamber 61 while the manual pump is being actuated. The one-way valve 50 only allows gas to flow into the gas chamber 25 when the gas pressure in the pressure adding chamber 61 exceeds the gas pressure in the gas chamber 25.

Figure 4A:
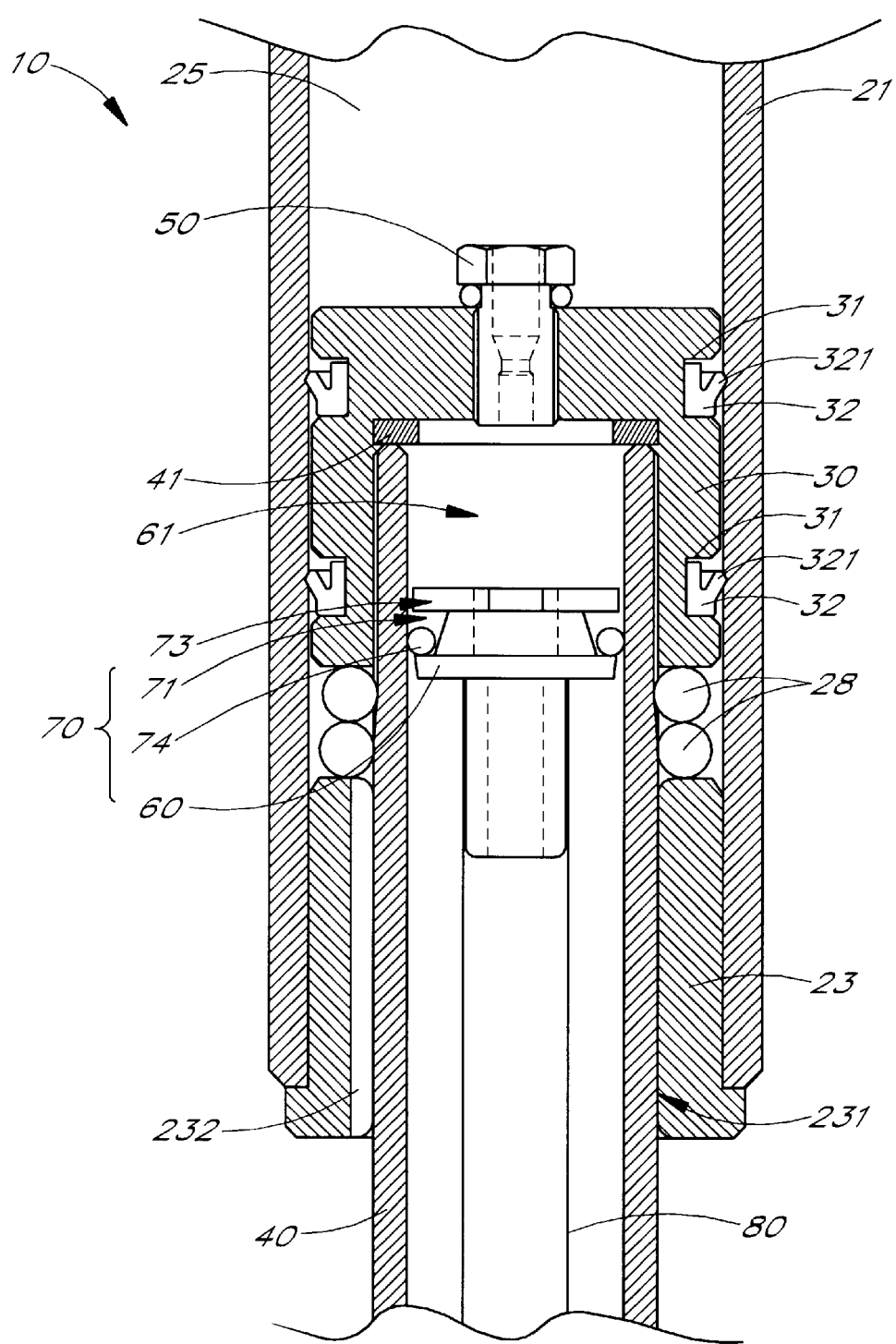
FIG. 4A shows the same view as FIG. 4 but with the O-ring forming a seal in the check device to prevent the escape of air from the pressure adding chamber.

The check device 70 on the pumping piston 60 comprises an annular slot 71 disposed on the peripheral edge of the pumping piston 60, two indentations 73 providing communication between the annular slot 71 and the pressure adding chamber 61, and an O-ring 74 disposed in the annular slot 71. The inner edge of the annular slot 71 is slanted to form a narrow gap between the inner edge and the inner wall of the shaft 40 at the bottom of the annular slot 71. When the O-ring 74 is pressed against the top of the annular slot 71, gas is free to enter the pressure adding chamber 61. Specifically, gas passes into the pressure adding chamber 61 via the interstice located between the pumping piston 60 and the shaft 40, as well as the interstice located between the annular slot 71 and the O-ring 74, and the indentations 73, as indicated by arrows in FIG. 4. When the O-ring 74 is pressed against the bottom of the annular slot 71, the O-ring 74 blocks the interstice between the pumping piston 60 and the shaft 40. In this position, the O-ring forms a seal to prevent the escape of gas from the pressure adding chamber 61 as shown in FIG. 4A.

It will be appreciated that the check device 70 just described is a versatile apparatus that can also be used for numerous other applications in the field of pneumatic pump technology. While the check device 70 is the preferred embodiment, other structures capable of bringing about an effect similar to that of the check device 70 are intended to be included within the scope of the present invention.

Referring again to FIG. 3, the top end of the pumping rod 80 is coupled to the pumping piston 60. The pumping rod 80 is provided at the bottom end with a base portion 81. As shown in FIG. 3, a buffer sleeve 92 may be used to cover the base portion 81, in which case the buffer sleeve 92 is used as a handgrip. The buffer sleeve 92 is secured to the base portion 81 by a bolt 82 that extends through the buffer sleeve 92 into the base portion 81. The base portion 81 is also provided with a retaining projection 94 that extends through a retaining hole 96 in the shaft 40 to secure the base portion 81 to the shaft 40. The retaining projection 94 is biased outward by a spring 98 housed within a cavity in the base portion 81.

Figure 5:
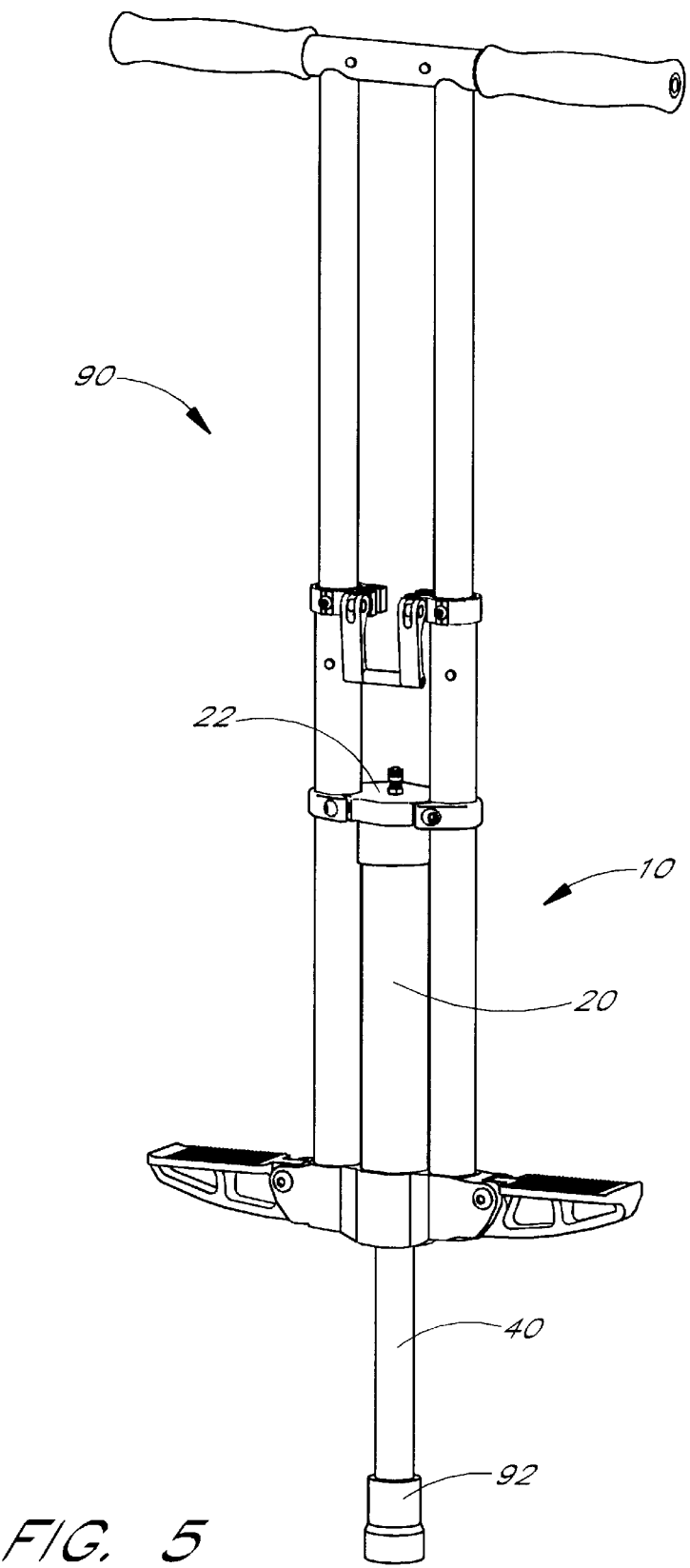
FIG. 5 shows a perspective view of the self-chargeable pneumatic cylinder of FIG. 1 incorporated into a collapsible pogo stick.

In one particular application, the self-chargeable pneumatic cylinder 10 of the present invention is incorporated into a pogo stick 90 as illustrated in FIG. 5. When used with a pogo stick 90, the self-chargeable pneumatic cylinder 10 provides a pneumatic spring of variable stiffness. The self-chargeable feature of the pneumatic cylinder 10 advantageously allows the spring stiffness to be adjusted to accommodate users of different body weights. Because the pump mechanism is contained within the shaft 40, the stiffness of the pneumatic spring can be increased without using an external pump. Because the pneumatic spring involves very few moving parts, frictional forces are minimized and the pneumatic spring provides a very smooth and enhanced jumping motion. When the pneumatic spring is used with a pogo stick 90, the shaft 40 is preferably provided at the bottom end with the buffer sleeve 92. The buffer sleeve 92 cushions the impact during use and protects the bottom end of the shaft 40 from damage.

Figure 6:
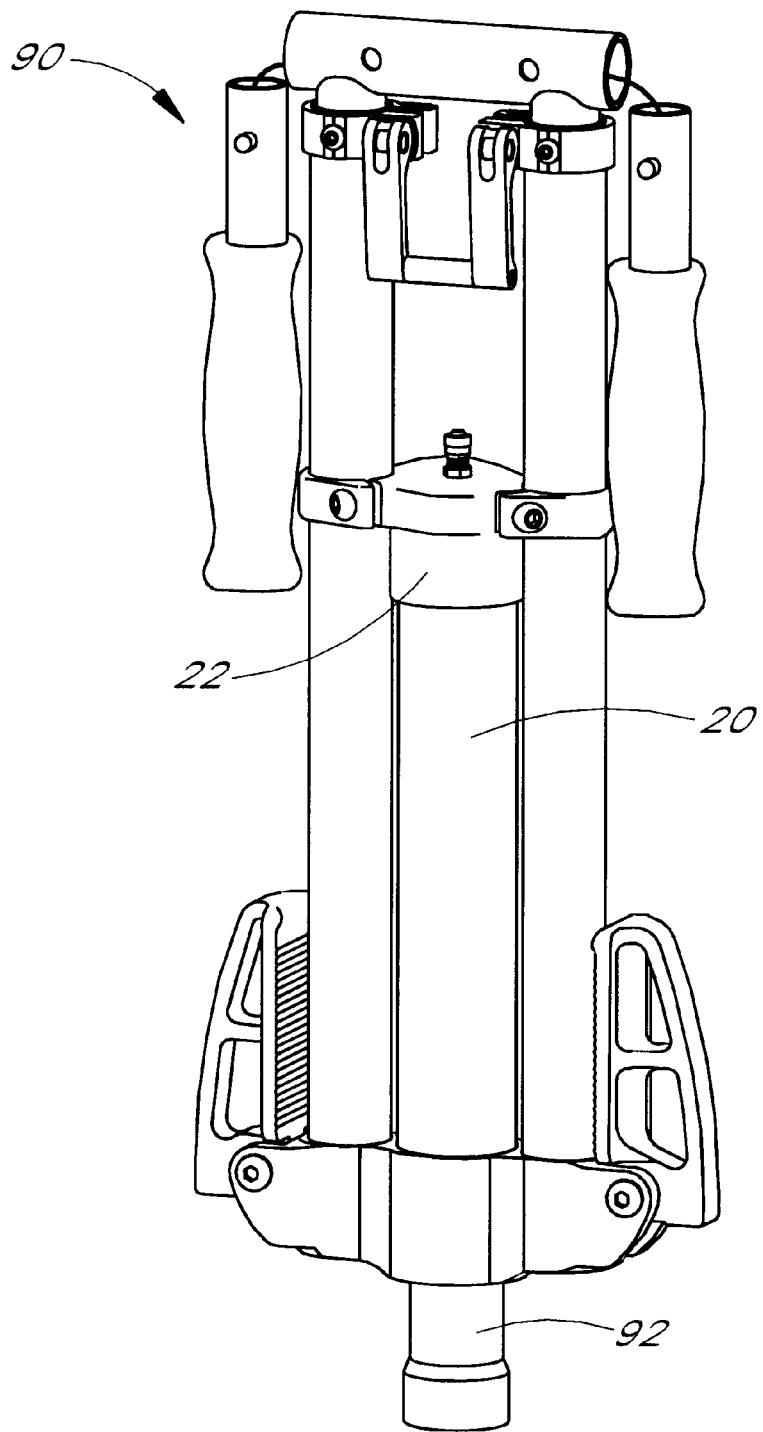
FIG. 6 shows another perspective view of the collapsible pogo stick of FIG. 5 in a collapsed condition.

Because the pump mechanism of the present invention is contained within the shaft 40 and the shaft can be withdrawn into the cylinder body 20, the pneumatic cylinder 10 of the present invention is very compact in size. Therefore, the pneumatic cylinder 10 is ideally suited for an application such as with a pogo stick 90 that is manufactured to be collapsible for compact storage and transportation as shown in FIG. 6. Further details as to a pogo stick of this type are disclosed in our application entitled "Collapsible Pogo Stick" Ser. No. 09/889,553, filed on the same date as the present application. The disclosure of this reference is herein incorporated in its entirety by reference thereto.

The operation and use of the self-chargeable pneumatic cylinder as used in a collapsible pogo stick will now be described with reference to FIGS. 1–6. The pneumatic cylinder 10 is prepared for use by releasing the pump rod 80 from the shaft 40 by pushing the retaining projection 94 out of the retaining hole 96. The user grips the buffer sleeve 92 at the base of the pump rod 80 and pulls the buffer sleeve outward from the shaft 40 thereby causing the pumping piston 60 to retract axially within the interior of the shaft 40. The outward movement of the pumping piston 60 causes a frictional force to be exerted on the O-ring 74 by the inner edge of the shaft 40 thereby causing the O-ring 74 to press against the top wall of the annular slot 71. With the O-ring in this position, the pressure adding chamber 61 is in communication with the atmosphere. Therefore, during the retraction of the pumping piston 60, the gas under the pumping piston 60 is sucked into the pressure adding chamber 61 through the check device 70.

Next, the pumping piston 60 is advanced into the shaft 40 by pushing the pumping rod 80 back into the shaft 40 to decrease the internal volume of the pressure adding chamber 61 and thereby increase the gas pressure. The advancement of the pumping piston 60 causes a frictional force to be exerted on the O-ring 74 by the inner wall of the shaft 40 thereby causing the O-ring 74 to press against the bottom end of the annular slot 71. With the O-ring in this position, the check device 70 forms a seal in the pumping piston 60 that prevents the gas in the pressure adding chamber 61 from escaping during advancement of the pumping piston 60. When the gas pressure in the pressure adding chamber 61 exceeds the gas pressure in the gas chamber 25, gas flows from the pressure adding chamber 61 to the gas chamber 25 in the cylinder body 20 via the one-way valve 50. The pumping rod 80 is reciprocally actuated in this manner until the desired pressure in the gas chamber 25 is attained. After the pneumatic cylinder 10 has been charged as described above, the pumping rod 80 is locked back into the shaft 40 and the pneumatic cylinder 10 is ready for use.

The collapsible pogo stick is prepared for use by attaching the grips to the middle tube, pivoting the plates downward to form a footrest, and extending the handlebar upward to the desired height to resemble the pogo stick illustrated shown in FIG. 5. When the user jumps on the pogo stick, the buffer sleeve 92 at the base of the shaft 40 strikes the ground with each downward cycle thereby forcing shaft 40 and working piston 30 upward into the cylinder body 20. The movement of the working piston 30 within the cylinder body 20 compresses the gas in the gas chamber 25, thereby resulting in a reaction force which serves as a spring to propel the working piston 30 and shaft 40 back downward from the cylinder body 20.

After use, the working piston 30 may be completely advanced into the cylinder body 20 by discharging all the gas from the gas chamber via the two-way valve 24. With the working piston 30 completely advanced into the cylinder body 20, the volume of the pneumatic cylinder 10 is minimized for compact storage and complements the collapsible features of the collapsible pogo stick.

Figure 7:
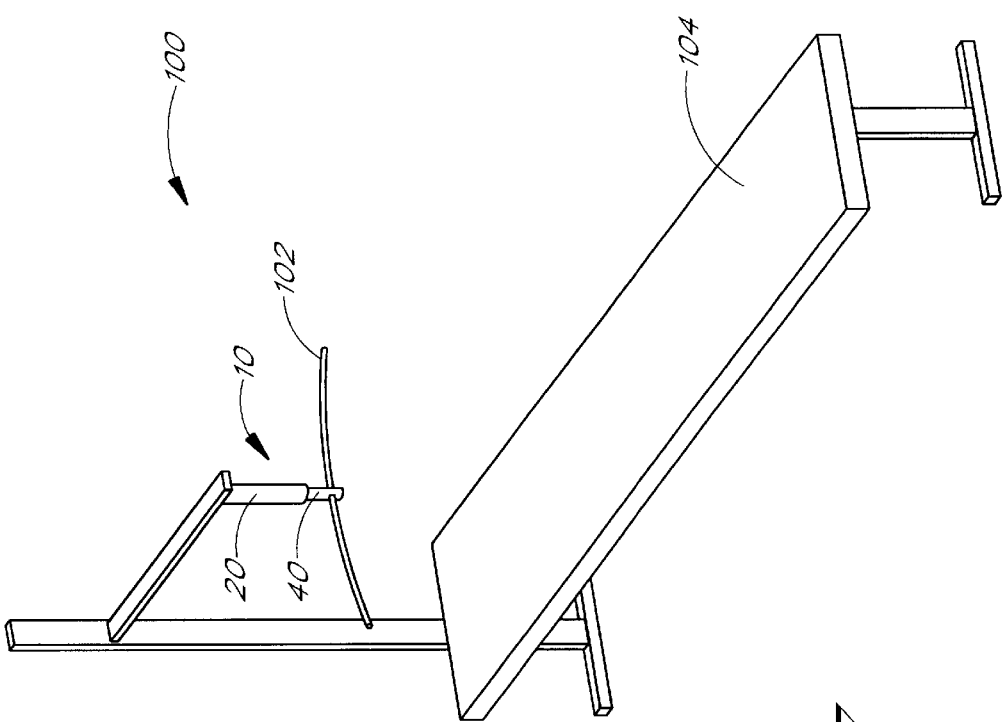
FIG. 7 shows a perspective view of the self-chargeable pneumatic cylinder of FIG. 1 incorporated into an exercise machine.
Figure 8A:
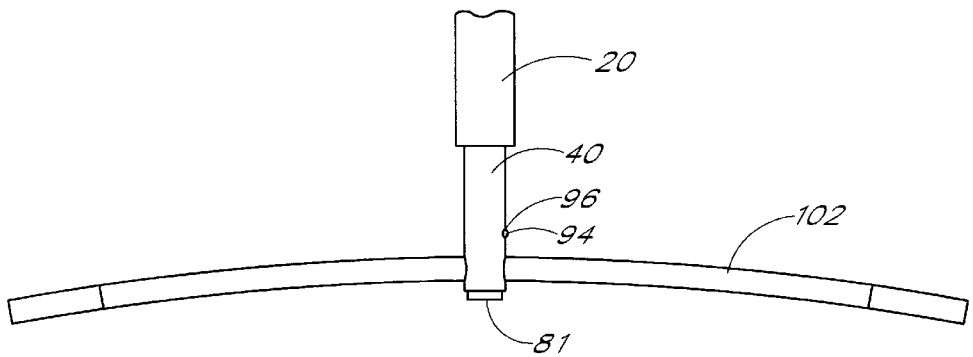
FIG. 8A shows an enlarged side view of the exercise machine of FIG. 7 illustrating the self-chargeable pneumatic cylinder with a bar connected to the shaft.
Figure 8B:
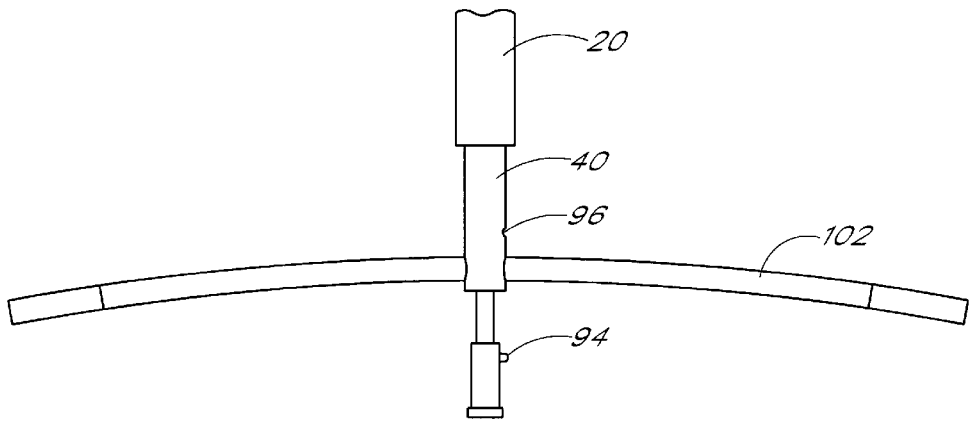
FIG. 8B shows another enlarged side view of the exercise machine of FIG. 7 whereby the pump rod is extended from the shaft for adjusting the resistance.

In another application, the self-chargeable pneumatic cylinder 10 of the present invention can be advantageously incorporated into an exercise machine 100 as illustrated in the example shown in FIGS. 7–8B. In this particular application, the pneumatic cylinder 10 provides a resistance force for building muscle strength in the arms. The pneumatic cylinder may also be used to provide adjustable resistance in other exercise machines, such as, for example, an abdominal exerciser or a leg press. The self-chargeable feature described above allows the user to adjust the pressure in the cylinder, which in turn adjusts the resistance force to suit the user's needs during exercise. Using the pneumatic cylinder 10 of the present invention eliminates the need for heavy weights and elastic members that can fatigue or break.

Referring still to the example illustrated in FIGS. 7–8B, a bar 102 is attached to the bottom end of the shaft 40 of the pneumatic cylinder 10 by welding, bolts or other suitable means. The user sits or lies on the bench 104 and grips the bar 102. The user pushes upward on the bar 102 to force the shaft 40 into the cylinder body 20F. FIG. 8A shows an enlarged view of the pneumatic cylinder 10 used in this application. The base portion 81 includes a retaining projection 94 that fits into a retaining hole 96 in the shaft 40 for securing the base portion 81 to the shaft 40. As shown in FIG. 8B, the base portion 81 can be released from the shaft 40 and extended downward for actuating the pumping rod 80 to increase the pressure in the cylinder 40. A valve (not shown) is provided on the cylinder for releasing gas from the cylinder 20 to decrease the resistance force.

In each of the embodiments described above, a significant feature of the present invention is the rugged quality of the components and the solid construction of the pneumatic cylinder. In the preferred embodiments, the primary components of the self-chargeable pneumatic cylinder are formed of a lightweight, non-rusting aluminum alloy, such as 6061. Because aluminum is lightweight and the components are generally hollow in construction, the self-chargeable pneumatic cylinder has great strength yet can be easily transported by the user. Aluminum is resistant to corrosion and therefore the self-chargeable pneumatic cylinder can be left outdoors for extended periods without rusting or diminishing in aesthetic value. Aluminum is also very durable and therefore the self-chargeable pneumatic cylinder can withstand impacts without incurring significant damage and will have a very long design life.

From the foregoing, it will be appreciated that the present invention is adaptable for use in a wide range of applications in the field of pneumatic and hydraulic cylinder technology. While particular forms of the invention have been illustrated and described, it will also be apparent that various additional modifications can be made without departing from the spirit and scope of the invention.

What is claimed is:

1. A pneumatic cylinder having an internal pump mechanism for charging the cylinder with atmospheric air comprising:

a hollow cylinder body defining a cavity therein, said cylinder body having a closed end and an open end;

a working piston slidably disposed within said cavity and having top and bottom ends, said top end of said working piston and said closed end of said cylinder body defining a gas chamber there between, a hollow elongate shaft having first and second ends and defining an interior portion therein, said first end being coupled to said bottom end of said working piston, said second end extending from said open end of said cylinder;

a pumping piston slidably disposed within said interior portion of said shaft and having top and bottom ends, said top end of said pumping piston and said bottom end of said working piston defining a pressure adding chamber therebetween;

a check device disposed on said pumping piston for preventing air from escaping said pressure adding chamber during advancement of said pumping piston into said interior portion of said shaft;

a pumping rod having a first end coupled to said bottom end of said pumping piston and a second end extendable from said shaft for facilitating reciprocal movement of said pumping piston; and a one-way valve extending through said working piston for enabling air to flow into said gas chamber from said pressure adding chamber;

whereby said reciprocal movement of said pumping piston within said shaft increases air pressure in said pressure adding chamber such that air flows from said pressure adding chamber to said gas chamber in said cylinder body across said one-way valve.

2. A self-chargeable pneumatic cylinder comprising:

a hollow cylinder body defining a cavity therein, said cylinder body having a closed end and an open end;

a working piston slidably disposed within said cavity and having top and bottom ends, said top end of said working piston and said closed end of said cylinder body defining a gas chamber therebetween;

a hollow elongate shaft defining an interior portion therein and having first and second ends, said first end being coupled to said bottom end of said working piston, said second end extending through said open end of said cylinder;

a pneumatic piston pump substantially self-contained within said interior portion of said shaft wherein said pneumatic piston pump is actuated to pump a gas into said gas chamber in said cylinder body, wherein said pneumatic piston pump comprises a pumping piston having top and bottom ends, said top end of said pumping piston and said bottom end of said working piston forming a pressure adding chamber therebetween; and a check device disposed on said pumping piston for preventing said gas from escaping said pressure adding chamber during advancement of said pumping piston into said shaft, wherein said check device comprises an annular slot disposed in the periphery of said pumping piston, at least one indentation formed in said pumping piston, said indentation in communication with said annular slot and said pressure adding chamber, and an O-ring disposed in said annular slot such that an outer edge of said O-ring contacts an inner wall of said shaft.

3. A self-chargeable pneumatic cylinder comprising:

a hollow cylinder body defining a cavity therein, said cylinder body having a closed end and an open end;

a working piston slidably disposed within said cavity and having top and bottom ends, said top end of said working piston and said closed end of said cylinder body defining a gas chamber therebetween;

a hollow elongate shaft defining an interior portion therein and having first and second ends, said first end being coupled to said bottom end of said working piston, said second end extending through said open end of said cylinder;

a pneumatic piston pump substantially self-contained within said interior portion of said shaft wherein said pneumatic piston pump is actuated to pump a gas into said gas chamber in said cylinder body, wherein said pneumatic piston pump comprises a pumping piston having top and bottom ends, said top end of said pumping piston and said bottom end of said working piston forming a pressure adding chamber therebetween; and a check device disposed on said pumping piston for preventing said gas from escaping said pressure adding chamber during advancement of said pumping piston into said shaft, wherein said check device comprises an annular slot disposed in the periphery of said pumping piston and an O-ring disposed in said annular slot and movable therein, wherein an inner edge of said slot is slanted such that said O-ring is capable of being in contact with both said inner edge of said slot and said inner wall of said shaft to form a seal therebetween.

4. A self-chargeable pneumatic cylinder comprising:

a hollow cylinder body defining a cavity therein, said cylinder body having a closed end and an open end;

a working piston slidably disposed within said cavity and having top and bottom ends, said top end of said working piston and said closed end of said cylinder body defining a gas chamber therebetween;

a hollow elongate shaft defining an interior portion therein and having first and second ends, said first end being coupled to said bottom end of said working piston, said second end extending through said open end of said cylinder;

a pneumatic piston pump substantially self-contained within said interior portion of said shaft wherein said pneumatic piston pump is actuated to pump a gas into said gas chamber in said cylinder body, wherein said pneumatic piston pump comprises a pumping piston having top and bottom ends, said top end of said pumping piston and said bottom end of said working piston forming a pressure adding chamber therebetween; and a check device disposed on said pumping piston for preventing said gas from escaping said pressure adding chamber during advancement of said pumping piston into said shaft, wherein said check device comprises an annular slot disposed in the periphery of said pumping piston, and an O-ring disposed in said annular slot, said O-ring being in contact with an inner wall of said shaft.

5. A self-chargeable pneumatic cylinder comprising:

a hollow cylinder body defining a cavity therein, said cylinder body having a closed end and an open end;

a working piston slidably disposed within said cavity and having top and bottom ends, said top end of said working piston and said closed end of said cylinder body defining a gas chamber therebetween;

a hollow elongate shaft defining an interior portion therein and having first and second ends, said first end being coupled to said bottom end of said working piston, said second end extending through said open end of said cylinder;

a pneumatic piston pump substantially self-contained within said interior portion of said shaft wherein said pneumatic piston pump is actuated to pump a gas into said gas chamber in said cylinder body; and a two-way gas valve disposed on said cylinder body for selectively providing communication between said gas chamber and the atmosphere.

6. A self-chargeable pneumatic cylinder comprising:

a hollow cylinder body defining a cavity therein, said cylinder body having a closed end and an open end;

a working piston slidably disposed within said cavity and having top and bottom ends, said top end of said working piston and said closed end of said cylinder body defining a gas chamber therebetween;

a hollow elongate shaft defining an interior portion therein and having first and second ends, said first end being coupled to said bottom end of said working piston, said second end extending through said open end of said cylinder; and a pneumatic piston pump substantially self-contained within said interior portion of said shaft wherein said pneumatic piston pump is actuated to pump a gas into said gas chamber in said cylinder body;

wherein a clearance is provided between an inner wall of said cylinder body and said working shaft for allowing atmospheric air to enter said cavity in said cylinder body below said bottom end of said working piston.

7. The cylinder of claim 6 wherein said clearance is formed by at least one slot formed along said inner wall of said cylinder body.

* * * * *